US005956831A

United States Patent [19]

McCarthy et al.

[11] Patent Number: 5,956,831

[45] Date of Patent: Sep. 28, 1999

[54] FORCING TOOL

[76] Inventors: Raymond G. McCarthy, 1400 Barton Rd., #1815, Redlands, Calif. 92373; John J. Henry, 14018 Champlain Ct., Fontana, Calif. 92336

[21] Appl. No.: 08/918,518

[22] Filed: Aug. 21, 1997

Related U.S. Application Data

[51] Int. Cl.[6] .......... B23P 19/04

[52] U.S. Cl. .......... 29/263

[58] Field of Search .......... 73/831, 833; 279/83, 279/59; 254/29 A; 29/263, 264–265, 254–255, 282, 280

[56] References Cited

U.S. PATENT DOCUMENTS

| | | | |
|---|---|---|---|
| 2,419,711 | 4/1947 | Dillon | 73/833 |
| 2,822,177 | 2/1958 | Tripp | 279/83 |
| 2,896,496 | 7/1959 | Jansen | 254/29 A |
| 3,102,333 | 9/1963 | Thornton et al. . | |
| 4,420,864 | 12/1983 | Hoyt | 29/263 |

*Primary Examiner*—Robert C. Watson
*Attorney, Agent, or Firm*—Sheldon & Mak

[57] ABSTRACT

An improved forcing tool for extracting a cylindrical article from a socket includes a frame having front and rear walls; a screw threadingly engaging the rear wall in alignment with a recess that extends through the front wall; and a collet removably rotatable on the screw for gripping and extracting the article. The collet has a body with a forwardly facing cavity, a plurality of cylindrical pockets in side walls of the cavity; gripping wedges in respective ones of the pockets, the pockets and outside surfaces of the wedge cylindrical portions being inclined for drawing the wedges together in response to forward movement thereof relative to the body; and a set screw threadingly engaging the body and projecting inwardly against one of the wedges for adjusting a spacing of the wedges. The improvement includes a rigid retainer fastened to the body for rigidly limiting axial movement of the wedges by contact with the leg portions. A compression spring biases the wedges radially outwardly and forwardly in the respective pockets, the spring extending through a guide slot of the body for flexibly retaining the wedges in rotational alignment. The adjustable wedge has a blade portion rearwardly projecting into sliding engagement with a guide slot of the body for positive restriction of the adjustable wedge within a rotational range that permits four-point engagement with the article.

8 Claims, 1 Drawing Sheet

FORCING TOOL

BACKGROUND

The present invention relates to tools for removing and installing force-fitted bushings, sleeves, linings, pins and the like relative to a device, which can be a universal joint (U-joint) having pressed-in bearing assembly.

U.S. Pat. No. 3,102,333 to Thornton et al. discloses a push-pull tool having an open-sided frame, a screw stem threadingly engaging the frame and having a collet assembly rotatably removably retained thereon within the frame, the patent being incorporated herein by this reference. The collet has wedge-shaped jaws that slidingly engage a body of the collet in a manner that produces tightening thereof when tension is applied to a bushing being grasped by the collet. The jaws are initially adjusted for clamping the bushing by a set-screw that threadingly engages the body of the collet. A Z-shaped spring extends across the jaws, engaging oppositely located recesses of the body for biasingly retaining the jaws within the body, and opposite sides of the jaws fit within respective grooves of the body for holding the jaws in facing alignment. The above-described tool of the prior is not entirely satisfactory; for example:

1. The jaws (especially the jaw being engaged by the set screw) are subject to tipping during the application of tension, particularly when only a short length of the bushing is exposed for engagement by the collet;
2. The Z-shaped spring is subject to breakage and/or disengagement from the body when great force is required to effect removal of the bushing;
3. Production jaws having normal manufacturing tolerances do not always line up properly to produce 4-point contact, being made of square stock; and
4. The jaws can become jammed, failing to properly augment the gripping by sliding within the body.

Thus there is a need for tool that overcomes the disadvantages of the prior art.

SUMMARY

The present invention meets this need by providing a tool of the type described above and having a stop member in place of the Z-shaped spring for rigidly blocking axial movement of the jaw wedges beyond a predetermined amount, the stop member also rigidly restraining the jaws from tipping when great extracting force is applied. In one aspect of the invention, an improved collet for gripping and tensioning a cylindrical article includes a body having a forwardly facing cavity, a plurality of cylindrical pockets being formed in side walls thereof and having gripping wedges therein, each wedge having a generally cylindrical gripping portion and a generally radially extending leg portion, the pockets and outside surfaces of the wedge cylindrical portions being inclined for drawing the wedges together in response to forward movement thereof relative to the body, an adjustment member movably engaging the body and engaging one of the wedges for adjusting a spacing of the wedges, the improvement including a rigid retainer member fastened to the body for rigidly limiting axial movement of the wedges by contact with the leg portions thereof; and biasing means for urging the wedges radially outwardly.

The tool can include two of the edges, the biasing means including a compression spring extending between leg portions of the wedges. Preferably the jaw members are rotatable within the pockets for permitting four-point engagement with the article, the body having a spring guide slot between the pockets for urging the jaw members toward facing rotational alignment.

Preferably the wedge having engagement by the adjustment member includes a rearwardly projecting radially oriented blade portion, the body having a corresponding slot formed therein for receiving the blade portion for maintaining alignment of the wedge relative to the pockets, the blade portion engaging the slot over a radial distance being greater than twice a width of the slot.

In another aspect of the invention, an improved forcing tool incorporates the improved collet for extracting a cylindrical article from a cylindrical socket of a device.

DRAWINGS

These and other features, aspects, and advantages of the present invention will become better understood with reference to the following description, appended claims, and accompanying drawings, where:

DESCRIPTION

Figure 1:
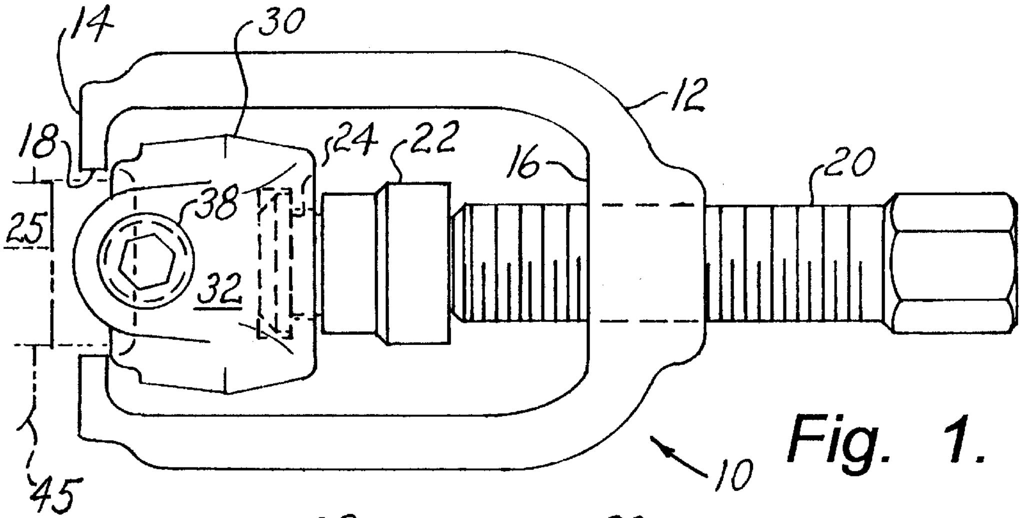
FIG. 1 is a plan view of an extracting tool according to the present invention.

The present invention is directed to an improved forcing tool that is particularly effective in extracting bearing bushings from conventional universal joints (U-joints). With reference to FIGS. 1–6 of the drawings, a forcing tool 10 includes an open frame 12 having a front wall 14 and a rear wall 16, a recess 18 being formed in the front wall. A clamp screw 20 threadingly engages the rear wall 18 in alignment with the recess 18 of the front wall 14, the screw 20 having a swivel member 22 concentrically rotatably engaged therewith within the frame 12, the swivel member having an annular groove 24 formed therein. A collet assembly 30 is radially engagable with the groove 24 for gripping a cylindrical workpiece member or bushing 25 and extracting same as described below, being drawn toward the rear wall 16 by the screw 20.

The collet assembly 30 includes a body 32 having a forwardly facing cavity 34 formed therein, a plurality of jaw pockets 35 being formed as lateral enlargements of the cavity 34 for receiving respective gripper jaw members or wedges 36. In the exemplary configuration of the drawings, there are two oppositely disposed jaw members, including an adjustable primary jaw 36A and a secondary jaw 36B, the primary jaw being adjustable radially inwardly by means of a set screw 38 that threadingly engages the body 32. The jaw pockets 35 are cylindrically formed at a ramp angle $\theta$ relative to a main axis 40 of the collet assembly 30, the jaw members 36 having corresponding cylindrical engagement with the pockets 35 for ramping the jaw members 36 into closer proximity in response to forward movement thereof relative to the body 32. As further shown in the drawings, each jaw member 36 has a generally cylindrical gripping portion 41 and a radially inwardly extending leg portion 42, the cylindrical portion 41 having a cylindrical gripping surface 44 being formed as a series of tapered annular groove segments. Characterization of the jaw members 36 as wedges follows from the outside of the cylindrical portion 40 being inclined at the angle θ from the gripping surface 44.

Figure 6:
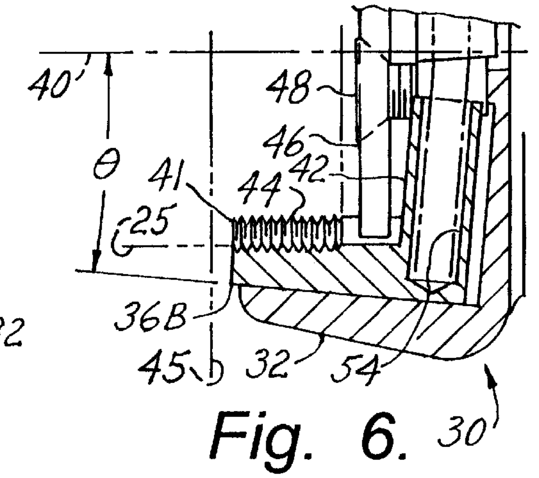
FIG. 6 is a fragmentary lateral sectional view showing the jaw forwardly displaced in a second stage of the extracting of FIG. 5.

The collet assembly 30 is adjustable using the set screw 38 for producing gripping engagement with the bushing 25, normally with the jaw members 36 being seated forwardly and outwardly in the jaw pockets 35. As used herein, the set screw 38 forms a part of the pocket 35 of the primary jaw 36A, being inclined correspondingly at the angle θ from being normal to the collet axis 40. When a threshold of gripping engagement has been achieved by tightening the set screw 38, retraction of the collet body 32 from the bushing 25 produces forward and inward movement of the jaw members 36 relative to the body 32, with consequent further tightening of the jaw members 36 on the bushing 25 as shown in FIG. 6. The retraction is achieved by turning of the clamp screw 20 to force the collet assembly 30 rearwardly relative to the frame 12, with the object of withdrawing the bushing 25 from a universal joint (U-joint) 45 for servicing same as further shown in FIG. 6. Further details of the tool 10, including details of the frame 12 and the swivel member 22, and engagement of the collet assembly 30 with the groove 24, are described in the above-referenced U.S. Pat. No. 3,102,333 to Thornton et al.

Figure 2:
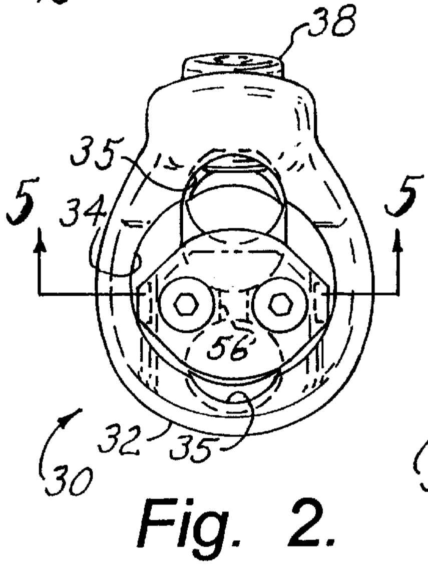
FIG. 2 is a front view of a collet portion of the tool of FIG. 1.
Figure 3:
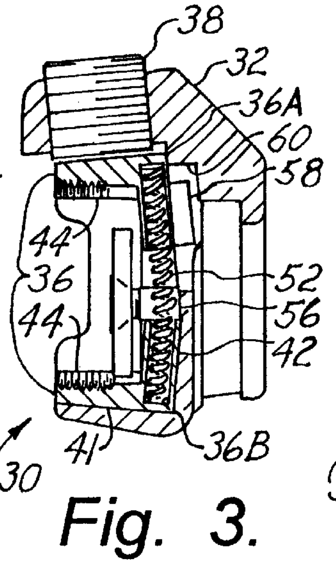
FIG. 3 is a fragmentary lateral sectional view of the collet portion of FIG. 2.
Figure 4:
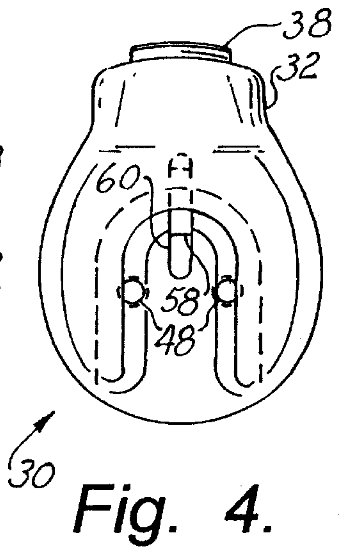
FIG. 4 is a rear view of the collet portion of FIG. 2.
Figure 5:
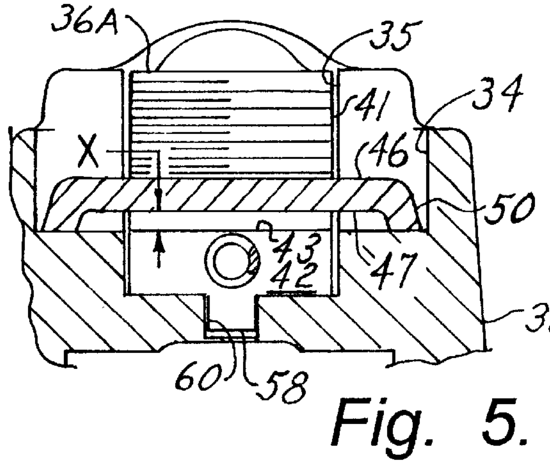
FIG. 5 is a bottom plan sectional view of the collet portion of FIG. 2 on line 5—5 therein, showing a jaw thereof seated for a first stage of extracting bearing bushings from a universal joint.

According to the present invention, a rigid stop member 46 is fastened within the jaw cavity 34 by a pair of stop fasteners 48 that threadingly engage the body 30, the stop member 46 having a rearwardly facing stop surface 47 that is spaced forwardly by a distance X from forwardly facing leg surfaces 43 of the leg portions 42 when the jaw members 34 are fully seated (forwardly and outwardly) in the jaw pockets 35 as shown in FIGS. 2, 3, and 5. In an exemplary configuration and as shown in the drawings, the stop member 46 is formed having rearwardly facing foot portions 50, the foot portions 50 together with the rearward extremity of the jaw cavity 34 defining an axial position of the stop surface 47, the thickness of the leg portions 42 and the depth of the jaw pockets 35 defining an axial position of the leg surfaces 43 in the expanded position of the jaw members 36. Alternatively, the foot portions 50 can be omitted, the rearward extremity of the jaw cavity 32 alone defining the axial position of the stop surface 47. Preferably the fasteners 48 are flat-headed and countersunk into the stop member 46 for permitting deep engagement of the bushing 25 within the jaw members 32 substantially against the stop member 46.

As best shown in FIG. 3, a coil compression spring 52 is interposed between the jaw members 32 for biasing same outwardly and rearwardly within the jaw pockets 35, thereby facilitating bidirectional adjustment by the above-described set screw 38. A desired length of the spring 52 is accommodated by forming the jaw members 34 with respective spring cavities 54, the cavities 54 also locating and guiding the spring 52. It will be understood that other forms of the spring 52 are possible, including a hairspring form that is particularly suitable for use with the collet assembly 30 having more than two of the jaw members 34. Importantly, the spring 52 is not relied upon for retaining the jaw members 36 within the body 32 in opposition to gripping forces being applied primarily at front portions of the gripping surfaces 44. Instead, the stop member 46 rigidly blocking forward movement of the leg portions 42 produces a restoring torque moment on the jaw members 36, the restoring moment being is opposite to an upsetting moment that is generated by axial and radial forces acting on forward extremities of the gripping surface 44. It is contemplated that when the bushing 25 is very tightly retained in the U-joint 45, the gripping surfaces 44 will slightly penetrate into the bushing 25 as the leg portions 42 come into full engagement with the stop member 46, thereby enhancing the available pulling forces.

The jaw pockets 35 are preferably circularly cylindrical, the jaw members also having a circularly cylindrical envelope for permitting rotational movement in the pockets 35, thereby to promote free axial sliding engagement for the further tightening of the jaw members 36 by allowing the gripping surfaces 44 to have "4-point" engagement with the bushing 25 in the presence of normal manufacturing tolerances. The circularly cylindrical envelope of the jaw members 36 and the corresponding shape of the jaw pockets 35 will be appreciated as facilitating accurate manufacture for promoting smooth sliding engagement. Initially, the jaw members 36 are maintained in nominal rotational alignment by the compression spring being laterally retained in a spring guide slot 56 of the body 32, the guide slot 56 extending between the jaw pockets 35 as best shown in FIG. 2. The primary jaw member 36A is additionally formed with a rearwardly projecting and radially extending key portion 58, the key portion 58 slidingly engaging a key guide slot 60 that is formed in the body 32. The key portion 58 has a slight clearance fit within the slot 60 for positively preventing more than a predetermined rotational movement of the primary jaw member 36A. Thus the jaw pocket 35 for the primary jaw member 36A can be slightly enlarged for facilitating free radial travel therein in response to adjustment by the set screw 38, the spring guide slot 56 being necessarily spaced from the primary jaw member 36A and having diminished effectiveness for alignment thereof except when the jaw member 36A is adjusted fully inwardly in the jaw pocket 35.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. In a collet for gripping and tensioning a cylindrical article, the collet including a body having a forwardly facing cavity, a plurality of cylindrical pockets being formed in side walls thereof and having gripping wedges therein, each gripping wedge having a generally cylindrical gripping portion and a generally radially extending leg portion, the pockets and outside surfaces of the gripping wedge cylindrical portions being inclined for drawing the gripping wedges together in response to forward movement thereof relative to the body, an adjustment member movably engaging the body and engaging one of the gripping wedges for adjusting a spacing of the gripping wedges, the improvement comprising:

(a) a rigid retainer member fastened to the body for rigidly limiting axial movement of the gripping wedges by contact with the leg portions thereof; and (b) biasing means for urging the gripping wedges radially outwardly, wherein the gripping wedge having engagement by the adjustment member includes a rearwardly projecting radially oriented blade portion, the body having a corresponding slot formed therein for receiving the blade portion for limiting rotation of the gripping wedge relative to the pocket, the blade portion engaging the slot over a radial distance being greater than twice a width of the slot.

2. The tool of claim 1, having two of the gripping wedges, wherein the biasing means comprises a compression spring extending between leg portions of the gripping wedges.

3. In a collet for gripping and tensioning a cylindrical article, the collet including a body having a forwardly facing cavity, a plurality of cylindrical pockets being formed in side walls thereof and having two gripping wedges therein, each gripping wedge having a generally cylindrical gripping portion and a generally radially extending leg portion, the pockets and outside surfaces of the gripping wedge cylindrical portions being inclined for drawing the gripping wedges together in response to forward movement thereof relative to the body, an adjustment member movably engaging the body and engaging one of the gripping wedges for adjusting a spacing of the gripping wedges, the improvement comprising:

(a) a rigid retainer member fastened to the body for rigidily limiting axial movement of the gripping wedges by contact with the leg portions thereof; and (b) a compression spring extending between leg portions of the gripping wedges for urging the gripping wedges radially outwardly, the gripping wedges being rotatable within the pockets for permitting four-point engagement with the article, the body having a spring guide slot between the pockets for urging the gripping wedges toward facing rotational alignment.

4. In a tool for extracting a cylindrical article from a cylindrical socket of a device, the tool having an open frame including a front wall and a rear for engaging the device, a screw threadingly engaging the rear wall in alignment with a recess that extends through the front wall and having a collet removably rotatable thereon for gripping and extracting the cylindrical article, the collet including a body having a forwardly facing cavity, a plurality of cylindrical pockets being formed in side walls thereof and having gripping wedges therein, each gripping wedge having a generally cylindrical gripping portion and a generally radially extending leg portion, the pockets and outside surfaces of the gripping wedge cylindrical portions being inclined for drawing the gripping wedges together in response to forward movement thereof relative to the body, an adjustment member movably engaging the body and engaging one of the gripping wedges for adjusting a spacing of the gripping wedges, the improvement comprising:

(a) a rigid retainer member fastened to the body for rigidly limiting axial movement of the gripping wedges by contact with the leg portions thereof; and (b) biasing means for urging the gripping wedges radially outwardly, wherein the gripping wedge having engagement by the adjustment member includes a rearwardly projecting radially oriented blade portion, the body having a corresponding slot formed therein for receiving the blade portion for limiting rotation of the gripping wedge relative to the pocket, the blade portion engaging the slot over a radial distance being greater than twice a width of the slot.

5. The tool of claim 4, having two of the gripping wedges, wherein the biasing means comprises a compression spring extending between leg portions of the gripping wedges.

6. In a tool for extracting a cylindrical article from a cylindrical socket of a device, the tool having an open frame including a front wall and a rear for engaging the device, a screw threadingly engaging the rear wall in alignment with a recess that extends through the front wall and having a collet removably rotatable thereon for gripping and extracting the cylindrical article, the collet including a body having a forwardly facing cavity, a plurality of cylindrical pockets being formed in side walls thereof and having gripping wedges therein, each gripping wedge having a generally cylindrical gripping portion and a generally radially extending leg portion, the pockets and outside surfaces of the gripping wedge cylindrical portions being inclined for drawing the gripping wedges together in response to forward movement thereof relative to the body, an adjustment member movably engaging the body and engaging one of the gripping wedges for adjusting a spacing of the gripping wedges, the improvement comprising:

(a) a rigid retainer member fastened to the body for rigidly limiting axial movement of the gripping wedges by contact with the leg portions thereof; and (b) biasing means for urging the gripping wedges radially outwardly, the gripping wedges being rotatable within the pockets for permitting four-point engagement with the article, the body having a spring guide slot between the pockets for urging the gripping wedges toward facing rotational alignment.

7. A tool for extracting a cylindrical article from a cylindrical socket of a device, comprising:

(a) an open frame including a front wall and a rear wall for engaging the device;

(b) a screw threadingly engaging the rear wall in alignment with a recess that extends through the front wall;

(c) a collet removably rotatable on the screw for gripping and extracting the cylindrical article, the collet including:

(i) a body having a forwardly facing cavity, a pair of cylindrical pockets being formed in side walls thereof, the body having a radially oriented slot formed therein in association with one of the pockets;

(ii) a pair of gripping wedges rotatably located in the pockets including an adjustable gripping wedge in the one pocket and a non-adjustable gripping wedge in the other pocket, each gripping wedge having a generally cylindrical gripping portion and a generally radially extending leg portion, the pockets and outside surfaces of the gripping wedge cylindrical portions being inclined for drawing the gripping wedges together in response to forward movement thereof relative to the body, the adjustable gripping wedge also including a blade portion rearwardly projecting into sliding engagement with the slot of the body for limiting rotation of the adjustable gripping wedge relative to the body, the engagement with the slot being inclusive of a radial engagement distance being greater than twice a width of the slot; and (iii) a set screw threadingly engaging the body and projecting inwardly against the adjustable gripping wedge for adjusting a spacing of the gripping wedges;

(d) a rigid retainer member fastened to the body for rigidly limiting axial movement of the gripping wedges by contact with the leg portions thereof; and (e) a compression spring extending between the leg portions of the gripping wedges for biasing the gripping wedges radially outwardly and rearwardly in the respective pockets, the spring being guided by the body for urging the gripping wedges toward facing alignment.

8. A collet for gripping and tensioning a cylindrical article, the collet comprising:

(a) a body having a forwardly facing cavity, a plurality of cylindrical pockets being formed in side walls thereof;

(b) a plurality of gripping wedges slidably located in the pockets including an adjustable gripping wedge in the one of the pockets, each gripping wedge having a generally cylindrical gripping portion and a radially inwardly extending leg portion, the pockets and outside surfaces of the gripping wedge cylindrical portions being inclined for drawing the gripping wedges together in response to forward movement thereof relative to the body;

(c) an adjustment member engaging the body and projecting inwardly against the adjustable gripping wedge for adjusting a spacing moment of the gripping wedges;

(d) means for biasing the gripping wedges radially outwardly and rearwardly in the respective pockets; and (e) a rigid retainer member fastened to the body for rigidly limiting forward axial movement of the gripping wedges by contact with the inwardly extending leg portions thereof, the retainer member producing restoring torque moments on the gripping wedges for opposing upsetting moments of axial and radial force reactions by the cylindrical article on forward extremities of the gripping portions of the wedges.

* * * * *